United States Patent
Smith et al.

(10) Patent No.: US 7,331,236 B2
(45) Date of Patent: Feb. 19, 2008

(54) PRESSURE SENSOR

(75) Inventors: Leif Smith, Uppsala (SE); Sauli Tulkki, Phuket (TH)

(73) Assignee: Radi Medical Systems AB, Uppsala (SE)

( * ) Notice: Subject to any disclaimer, the term of this patent is extended or adjusted under 35 U.S.C. 154(b) by 0 days.

(21) Appl. No.: 11/384,817

(22) Filed: Mar. 21, 2006

(65) Prior Publication Data

US 2007/0220986 A1     Sep. 27, 2007

(51) Int. Cl.
*G01L 7/00* (2006.01)
(52) U.S. Cl. ............................. 73/703; 73/721; 73/727
(58) Field of Classification Search ................. 73/725, 73/721, 719, 727, 702
See application file for complete search history.

(56) References Cited

U.S. PATENT DOCUMENTS

| | | | |
|---|---|---|---|
| 5,189,914 A | | 3/1993 | White et al. |
| RE35,648 E | | 11/1997 | Tenerz et al. |
| 6,178,820 B1 | * | 1/2001 | Kirjavainen et al. .......... 73/647 |
| 2001/0037066 A1 | | 11/2001 | Smith |
| 2003/0094431 A1 | | 5/2003 | Shing et al. |
| 2003/0119220 A1 | * | 6/2003 | Mlcak et al. ................. 438/52 |
| 2004/0169444 A1 | * | 9/2004 | Higuchi et al. ............. 310/348 |

FOREIGN PATENT DOCUMENTS

| | | |
|---|---|---|
| GB | 2 235 533 A | 3/1991 |
| WO | WO 2005/058166 A1 | 6/2005 |

* cited by examiner

*Primary Examiner*—Andre J Allen
(74) *Attorney, Agent, or Firm*—Foley & Lardner LLP

(57) ABSTRACT

A sensor and insertion assembly 2 is used for intravascular measurement of pressure in a living body. The assembly includes, a sensor chip 6 having a substrate body 8 with a recess covered by a pressure sensitive film 10 thereby forming a cavity 12. A piezoelectric element, preferably in the form of a piezoelectric film 14, is arranged in connection with the pressure sensitive film, and energy is applied to the piezoelectric element such that acoustic waves are generated in the element. The piezoelectric element is arranged to generate an output signal, representing the pressure at the film, in dependence on the measured properties of the acoustic waves related to the deflection of the pressure sensitive film.

37 Claims, 2 Drawing Sheets

PRESSURE SENSOR

FIELD OF THE INVENTION

The present invention relates generally to a pressure sensor, and in particular to sensor and insertion assemblies, in which a pressure sensor is mounted at the distal end, or close to the distal end, of an insertion means for intravascular measurements of pressure in a living body, and in particular to properties of the sensor element. A person skilled in the art realizes that the pressure sensor naturally may be arranged at any device adapted to be inserted into the body of a living body, e.g. a cannula, an electrode lead for heart stimulation, or a catheter.

BACKGROUND OF THE INVENTION

The need for measuring and recording physiological pressures, for example, in the coronary vessels, has triggered the development of miniaturized devices for enabling the access to the very narrow vessels, such as coronary vessels. Typically a sensor of very small size is mounted on a guide wire, which is inserted in e.g. the femoral artery and guided to the desired point of measurement, e.g. a coronary vessel. There are certain problems associated with the integration of a pressure sensor onto a guide wire suitable for the type of measurements mentioned above. The first and foremost problem is to make the sensor sufficiently small. Also, the number of electrical connections and leads should be minimized, in order to obtain a sufficiently flexible guide wire which can be guided to the desired location through the coronary vessels without too much difficulty.

Sensor and guide wire assemblies in which a sensor is mounted at the distal end of a guide wire are known. In U.S. patent Re. 35,648, which is assigned to the present assignee, an example of such a sensor and guide wire assembly is disclosed, where a sensor guide comprises a sensor element, an electronic unit, a signal transmitting cable connecting the sensor element to the electronic unit, a flexible tube having the cable and the sensor element disposed therein, a solid metal wire (a core wire), and a coil attached to the distal end of the solid wire. The sensor element comprises a pressure sensitive device, e.g. a membrane, with piezoresistive elements connected in a Wheatstone bridge-type of arrangement mounted thereon.

Piezoelectricity refers to the production of electrical charges by the imposition of mechanical stress. The phenomenon is reciprocal. Applying an appropriate electrical field to a piezoelectric material creates a mechanical stress. Piezoelectric acoustic wave sensors apply an oscillating electric field to create a mechanical wave, which propagates through the substrate and is then converted back to an electric field for measurement.

Among the piezoelectric materials that can be used for acoustic wave sensors and devices, the most common are quartz ($SiO_2$), lithium tantalate ($LiTaO_3$), and, to a lesser degree, lithium niobate ($LiNbO_3$). Each has specific advantages and disadvantages, which include cost, temperature dependence, attenuation, and propagation velocity. Other materials with commercial potential include gallium arsenide (GaAs), silicon carbide (SiC), langasite (LGS), zinc oxide (ZnO), aluminum nitride (AlN), lead zirconium titanate (PZT), and polyvinylidene fluoride (PVdF).

The sensors are often made by a photolithographic process. Manufacturing begins by carefully polishing and cleaning the piezoelectric substrate. Metal, usually aluminium, is then deposited uniformly onto the substrate. The device is spin-coated with a photoresist and baked to harden it. It is then exposed to UV light through a mask with opaque areas corresponding to the areas to be metallized on the final device. The exposed areas undergo a chemical change that allows them to be removed with a developing solution. Finally, the remaining photoresist is removed. The pattern of metal remaining on the device is called an interdigital transducer, or IDT. By changing the length, width, position, and thickness of the IDT, the performance of the sensor can be maximized.

If instead the piezoelectric material is in the form of a piezoelectric film conventional thin film technology may be used, starting with a substrate, e.g. a silicon substrate, upon which one or many film(s) and electrode areas are arranged. In addition to the piezoelectric film may be arranged an impedance matching film, an insulating film etc. This will be further discussed in the detailed description.

Acoustic wave devices are described by the mode of wave propagation through or on a piezoelectric substrate. Acoustic waves are distinguished primarily by their velocities and displacement directions; many combinations are possible, depending on the material and boundary conditions. The IDT of each sensor provides the electric field necessary to displace the substrate and thus form an acoustic wave. The wave propagates through the substrate, where it is converted back to an electric field at the IDT on the other side. Transverse, or shear, waves have particle displacements that are normal to the direction of wave propagation and which can be polarized so that the particle displacements are either parallel to or normal to the sensing surface. Shear horizontal wave motion signifies transverse displacements polarized parallel to the sensing surface; shear vertical motion indicates transverse displacements normal to the surface.

A wave propagating through the substrate is called a bulk wave. The most commonly used bulk acoustic wave (BAW) devices are the thickness shear mode (TSM) resonator and the shear-horizontal acoustic plate mode (SH-APM) sensor.

If the wave propagates on the surface of the substrate, it is known as a surface wave. The most widely used surface wave devices are the surface acoustic wave sensor and the shear-horizontal surface acoustic wave (SH-SAW) sensor, also known as the surface transverse wave (STW) sensor.

All acoustic wave devices are sensors in that they are sensitive to perturbations of many different physical parameters. Any change in the characteristics of the path over which the acoustic wave propagates will result in a change in output.

Acoustic wave sensors are utilized in a number of sensing applications, such as, for example, temperature, pressure and/or gas sensing devices and systems e.g. used for measuring tire pressure and temperature for monitoring vehicle tires.

Examples of surface wave sensors include devices such as acoustic wave sensors, which can be utilized to detect the presence of substances, such as chemicals. An acoustic wave device, using for example, surface acoustic waves (SAW) or bulk acoustic waves (BAW), and acting as a sensor can provide a highly sensitive detection mechanism due to the high sensitivity to surface loading and the low noise, which results from their intrinsic high Q factor.

As mentioned above, surface acoustic wave devices are typically fabricated using photolithographic techniques with comb-like interdigital transducers (IDTs) placed on a piezoelectric material. Surface acoustic wave devices may have either a delay line or a resonator configuration. The selectivity of a surface acoustic wave chemical/biological sensor is generally determined by a selective coating placed on the piezoelectric material. The absorption and/or adsorption of the species to be measured into the selective coating can cause mass loading, elastic, and/or viscoelastic effects on the SAW/BAW device. The change of the acoustic property due to the absorption and/or adsorption of the species can be interpreted as a delay time shift for the delay line surface acoustic wave device or a frequency shift for the resonator (BAW/SAW) acoustic wave device.

An example of an application area for the above sensor may be found in U.S. Pat. No. 6,958,565 that relates to a passive wireless piezoelectric smart tire sensor with reduced size.

Another example of an application area for the above sensor type is found in WO-2005/058166 that relates to a surface or bulk acoustic wave device that can be implanted in a human or animal body to monitor various parameters thereof, e.g. pressure. The device comprises a pair of interdigitated transducers spaced apart over the surface of a piezoelectric substrate that is exposed to the pressure to be monitored. The device is interrogated by a radio-frequency signal being supplied to one of the transducers and detected after reflection by the other transducer. The parameter is measured by comparison of the supplied and received signals.

The object of the present invention is to achieve an improved pressure sensor, in particular for in-vivo measurements, and especially for a sensor and insertion assembly for intravascular measurement of pressure in a living body

SUMMARY OF THE INVENTION

The above-mentioned object is achieved by the present invention according to the independent claim.

Preferred embodiments are set forth in the dependent claims.

Thus, the present invention relates to a pressure sensor including a sensor chip having a substrate body that comprises a recess covered by a pressure sensitive film thereby forming a cavity. A piezoelectric element, preferably in the form of a piezoelectric film, is arranged in connection with said pressure sensitive film, and an energy feeding means is arranged to apply energy to the piezoelectric element such that acoustic waves are generated in said element, wherein the piezoelectric element is arranged to generate an output signal, representing the pressure at the film, in dependence of measured properties of the acoustic waves related to the deflection of the pressure sensitive film.

SHORT DESCRIPTION OF THE APPENDED DRAWINGS

DETAILED DESCRIPTION OF PREFERRED EMBODIMENTS OF THE INVENTION

The present invention will now be described in detail with references to the accompanied figures. Where applicable, the same reference signs are used throughout the figures to indicate identical or equivalent items.

Figure 6:
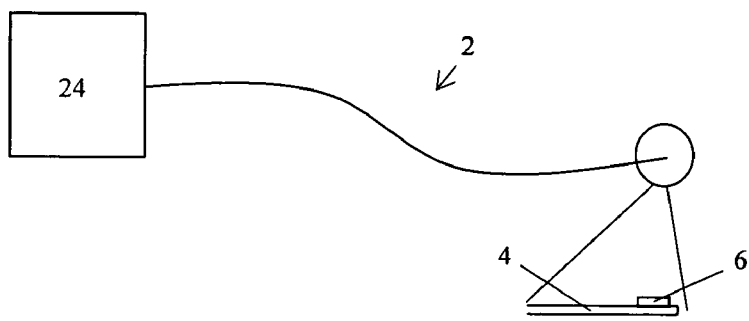
FIG. 6 is a schematic illustration of a sensor and insertion assembly according to the present invention.

FIG. 6 is a schematic illustration of a sensor and insertion assembly 2 for intravascular measurement of pressure in a living body according to the present invention, comprising a insertion means 4 and a sensor chip 6.

According to a preferred embodiment the invention generally relates to a pressure sensor for in-vivo measurements of pressure, e.g. to perform intravascular measurements, but also other in-vivo measurements such as measuring intracranial pressure.

According to a second preferred embodiment the sensor and insertion assembly comprises a guide wire assembly including a core wire of the kind, e.g. disclosed in the above-mentioned US patent Re. 35,648, which is incorporated herein in its entirety.

Figure 1:
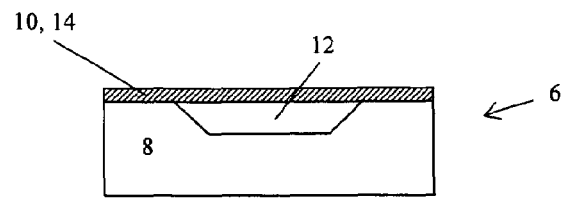
FIG. 1 is a schematic illustration showing a cross sectional view of a sensor chip according to a first embodiment of the present invention.

FIG. 1 is a schematic illustration showing a cross sectional view of a sensor chip 6 according to a first embodiment of the present invention. The sensor chip 6 includes a substrate body 8 that comprises a recess covered by a pressure sensitive film 10 thereby forming a cavity 12.

A piezoelectric element 14 is arranged in connection with the pressure sensitive film, and an energy feeding means 16 (see FIG. 7) is adapted to apply energy to the piezoelectric element such that acoustic waves are generated in the element. The piezoelectric element then generates an output signal, representing the pressure at the film, in dependence of measured properties of the acoustic waves related to the deflection of the pressure sensitive film.

In the first embodiment, illustrated in FIG. 1, the piezoelectric element is in the form of an elastic piezoelectric film being the pressure sensitive film.

Figure 2A:
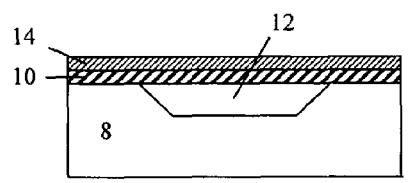
FIG. 2a is a schematic illustration showing a cross sectional view of a sensor chip according to a second embodiment of the present invention.

FIG. 2a is a schematic illustration showing a cross sectional view of a sensor chip according to a second embodiment of the present invention where the pressure sensitive film is attached to the substrate body and the piezoelectric film is attached on said pressure sensitive film.

Figure 2B:
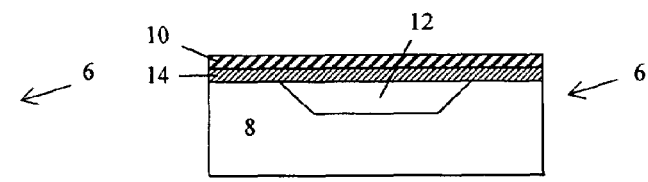
FIG. 2b is a schematic illustration showing a cross sectional view of a sensor chip according to a third embodiment of the present invention.

FIG. 2b is a schematic illustration showing a cross sectional view of a sensor chip according to a third embodiment of the present invention where the piezoelectric film is attached to the substrate body and the pressure sensitive film is attached on said piezoelectric film.

Figure 5:
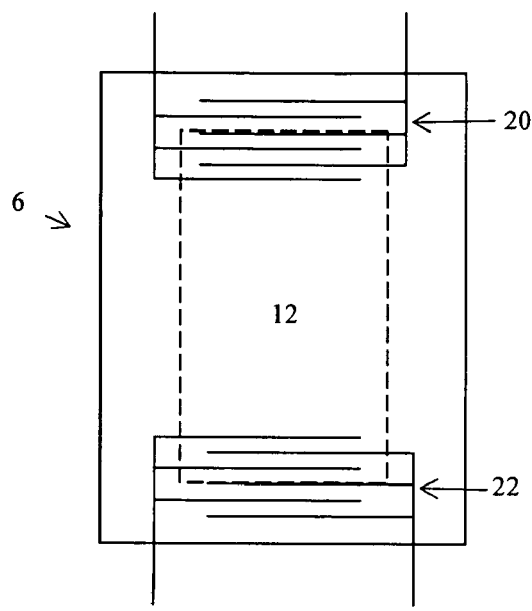
FIG. 5 is a schematic illustration showing a top view of a sensor chip according to the present invention.

In the above first, second and third embodiments the energy is preferably applied to, and obtained from, the piezoelectric film via a pair of interdigital transducers (IDT) 20 and 22 (see FIG. 5), respectively. These are illustrated in FIG. 5 that is a schematic illustration of a top view of a sensor chip according to the present invention. The IDTs are either arranged on the side of the piezoelectric film facing the substrate body, or on the opposite side of the film. The inventor has found that by arranging the IDTs on the side of the piezoelectric film facing the substrate body advantageous impedance performance may be obtained.

As an alternative one of said IDTs is arranged on one side of the piezoelectric film and the other is arranged on the opposite side.

In the above second and third embodiments the piezoelectric film preferably covers the entire recess, however, as an alternative, the film may cover only a part of the recess.

Figure 3:
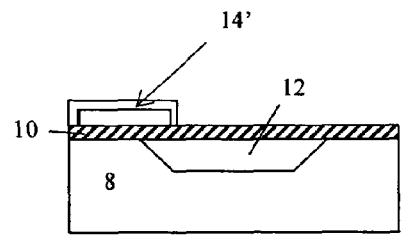
FIG. 3 is a schematic illustration showing a cross sectional view of a sensor chip according to a fourth embodiment of the present invention.

According a fourth embodiment of the present invention the piezoelectric element is a piezoelectric beam 14' arranged on said pressure sensitive film. This embodiment is illustrated in FIG. 3 schematically showing a cross sectional view of a sensor chip. In this embodiment the piezoelectric beam is encapsulated and arranged where the highest signal amplitude is expected dependent of the deflection of the film, as an example this may be close to the border of the recess. One further piezoelectric beam may also be arranged to be used for obtaining a reference pressure and in that case the beam is arranged where no, or very low, signal is expected. As an alternative the piezoelectric beam 14' may be arranged in the recess, i.e. under the pressure sensitive film.

Figure 4A:
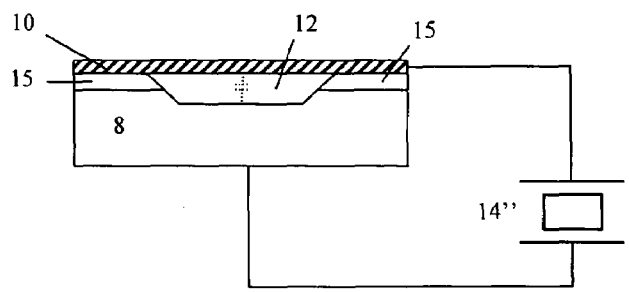
FIGS. 4a and 4b are schematic illustrations showing cross sectional views of two variants of a sensor chip according to a fifth embodiment of the present invention.

According a fifth embodiment of the present invention, generally illustrated in FIG. 4a, the pressure sensitive film that covers the recess is electrically insulated from the substrate body by an insulating film 15. The piezoelectric element, preferably in the form of a piezoelectric crystal, is connected to the pressure sensitive film and the substrate body such that a capacitive pressure sensor is created being a resonance circuit having a resonance frequency dependent upon the pressure on the film. The created capacitance is illustrated in the figure by a capacitor (dotted) between the film and the substrate body.

Figure 4B:
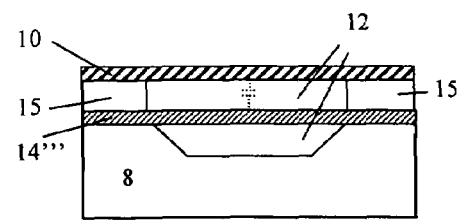

In FIG. 4b a variation of the fifth embodiment is illustrated where a piezoelectric element, in the form of a piezoelectric film 14''', is arranged within the cavity 12 and separated from the pressure sensitive film 10 by an insulating film 15. As in some of the previous embodiments, the energy is preferably applied to, and obtained from, the piezoelectric film via a pair of interdigital transducers (IDT), not shown in the figure. Thus, this variant covers the general concept of arranging the piezoelectric element within the cavity, or physically connected to the reference cavity of a capacitive pressure sensor. One of the electrodes used to apply energy to the piezoelectric film may in addition be used for connection with the pressure sensitive film. As an alternative the electrodes used for connection with the piezoelectric film and pressure sensitive film, respectively, may be connected together outside the cavity.

Applicable to all embodiments, the energy supplied to the piezoelectric element is supplied by the energy feeding means that is connected to an electrical cable connected to an external energy generator (not shown). As an alternative the energy feeding means is connected to an antenna for wireless connection to the external energy generator. As a further alternative the energy feeding means may be connected to a miniature battery means (not shown) arranged in connection with the sensor chip.

Figure 7:
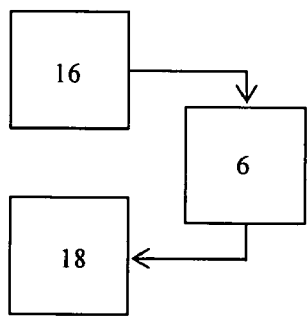
FIG. 7 is a block diagram schematically illustrating the present invention.

The generated output signal may be wirelessly transmitted to a processing unit 18 (see FIG. 6) or transmitted to the processing unit via electrical cables. The processing unit is preferably arranged at the same substrate body as the pressure sensor. This is particularly advantageous from a manufacturing point of view, but also in order to achieve a high signal to noise ratio. Another alternative is to arrange the processing unit as a separate part arranged at the distal end of the core wire close to the sensor chip. A still further alternative is to arrange the processing unit at an external unit 24 (FIG. 7).

The processing unit then determines the pressure based upon properties of the output signal which may be derived by measuring of bulk acoustic waves (BAW) through said piezoelectric element, or by measuring of surface acoustic waves (SAW) on said piezoelectric element, or by measuring of lamb waves of said piezoelectric element. These measured properties include the delay of the acoustic wave or the change of resonant frequency of the acoustic wave.

In the above embodiments the cavity preferably is evacuated and that the generated pressure signal then represents the absolute pressure. If the cavity not is evacuated, a reference pressure has to be used as a reference value for the pressure determined by the pressure sensor.

The pressure sensitive film is preferably made from silicon (Si) and the piezoelectric film is made from any of PZT, ZnO, BaTiO$_3$ or ANI. The piezoelectric film has a thickness of less than 100 µm, preferably in the range of 0.1-20 µm. The sensor chip has a thickness preferably in the interval 0.05-2 µm, a length of less than 10 mm and a width of less than 2 mm.

The pressure sensor according to the invention may also be a separate self-contained device, i.e. not arranged at any insertion means, and may then be used both in medical, e.g. to perform intra-cranial measurements, and non-medical applications, e.g. to perform pressure measurements in tyres and in dangerous environments. In both the medical and non-medical application the pressure sensor must be provided with an energy means, e.g. a miniature battery or a rechargeable capacitor, and a communication means, e.g. a telemetry coil.

According to an alternative embodiment the assembly includes temperature compensating means to compensate for temperature variations that influence the measurement.

Figure 8:
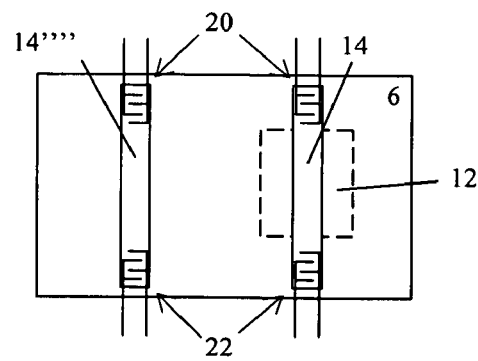
FIG. 8 is a schematic illustration showing a top view of a sensor chip according to an alternative embodiment of the present invention.

According to another alternative embodiment the assembly further includes a temperature measurement means adapted to measure the temperature in the living body. This embodiment is illustrated in FIG. 8 showing a top view of a sensor chip according to an alternative embodiment of the present invention. The sensor chip 6 comprises a recess 12, preferably covered by a flexible film (not shown) and a piezoelectric element 14, here in the form of a strip above a part of the recess. The sensor chip 6 is further provided with an additional piezoelectric element 14'''' in the form of a strip. Energy is applied to the additional piezoelectric element 14'''' via the IDT 20 and an output signal that vary in dependence of the ambient temperature is available at IDT 22. The energy applied to the pressure sensor via IDT 20 may have a first resonant frequency, f1, and the energy applied to the temperature sensor via IDT 22 may have a second resonant frequency, f2, and the frequencies of the respective output signals will then vary in accordance with the measured pressure and temperature, respectively.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. Pressure sensor comprising:
    a sensor chip having a substrate body that comprises a recess covered by a pressure sensitive film such that a cavity is formed,
    a piezoelectric element arranged in connection with said pressure sensitive film, and an insulating film isolating the pressure sensitive film from the substrate body, wherein said piezoelectric element is adapted to receive energy from an energy source such that acoustic waves are generated in said piezoelectric element, and wherein the piezoelectric element is arranged to generate an output signal, representing a pressure at the film, in dependence on measured properties of the acoustic waves related to a deflection of the pressure sensitive film.

2. Sensor and insertion assembly according to claim 1, wherein the pressure sensitive film is attached to the substrate body and the piezoelectric film is attached on said pressure sensitive film.

3. Sensor and insertion assembly according to claim 2, wherein the piezoelectric film is attached to the substrate body and the pressure sensitive film is attached on said piezoelectric film.

4. Sensor and insertion assembly according to claim 2, wherein said piezoelectric film is in a form of an elastic piezoelectric film being said pressure sensitive film.

5. Pressure sensor according to claim 1, wherein said pressure sensitive film is made from silicon (Si).

6. Sensor and insertion assembly according to claim 2, wherein the energy source is a pair of interdigital transducers (IDT) that applies and receives the energy from the piezoelectric film.

7. Sensor and insertion assembly according to claim 6, wherein said IDTs are arranged on a side of the piezoelectric film facing the substrate body.

8. Sensor and insertion assembly according to claim 6, wherein said IDTs are arranged on a side of the piezoelectric film not facing the substrate body.

9. Sensor and insertion assembly according to claim 6, wherein one of said IDTs is arranged on one side of the piezoelectric film and the other is arranged on the other side.

10. Pressure sensor according to claim 1, wherein said piezoelectric element is connected to said pressure sensitive film and said substrate body such that a capacitive pressure sensor is created being a resonance circuit having a resonance frequency dependent upon the pressure on the pressure sensitive film.

11. Sensor and insertion assembly according to claim 2, wherein the piezoelectric film is made from any of PZT, ZnO, BaTiO$_3$ or ANI.

12. Sensor and insertion assembly according to claim 2, wherein the piezoelectric film has a thickness of less than 100 μm.

13. Sensor and insertion assembly according to claim 2, wherein the piezoelectric film has a thickness of 0.5-100 μm.

14. Sensor and insertion assembly according to claim 2, wherein the piezoelectric film has a thickness of approximately 1 μm.

15. Pressure sensor according to claim 1, wherein said pressure sensor is adapted for in-vivo measurement of pressure in a living body.

16. Sensor and insertion assembly for intravascular measurement of pressure in a living body, comprising:

an insertion device configured to insert the pressure sensor in a living body;

wherein the pressure sensor comprises a sensor chip having a substrate body that comprises a recess covered by a pressure sensitive film such that a cavity is formed, wherein a piezoelectric element is arranged in connection with said pressure sensitive film, and said piezoelectric element is adapted to receive energy from an energy source such that acoustic waves are generated in said piezoelectric element, and wherein the piezoelectric element is arranged to generate an output signal, representing a pressure at the film, in dependence on measured properties of the acoustic waves related to a deflection of the pressure sensitive film.

17. Sensor and insertion assembly according to claim 16, wherein the assembly is a guide wire assembly, wherein the insertion device is a core wire of the guide wire assembly and the pressure sensor is arranged at a distal end region of the core wire.

18. Sensor and insertion assembly according to claim 16, further comprising the energy source, wherein the energy source is connected to an electrical cable connected to an external energy generator.

19. Sensor and insertion assembly according to claim 16, further comprising the energy source, wherein the energy source is connected to an antenna for wireless connection to an external energy generator.

20. Sensor and insertion assembly according to claim 16, further comprising the energy source, wherein the energy source is connected to a miniature battery arranged in connection with the sensor chip.

21. Sensor and insertion assembly according to claim 16, further comprising a processing unit, wherein said generated output signal is applied to the processing unit which determines the pressure based upon properties of said output signal.

22. Sensor and insertion assembly according to claim 21, wherein said processing unit is arranged at the substrate body.

23. Sensor and insertion assembly according to claim 21, wherein said generated output signal is wirelessly transmitted to the processing unit.

24. Sensor and insertion assembly according to claim 21, wherein said generated output signal is transmitted to the processing unit via electrical cables.

25. Sensor and insertion assembly according to claim 21, wherein the assembly includes temperature compensating means for compensating temperature variations that influence measurement of pressure at the film.

26. Sensor and insertion assembly according to claim 21, wherein the assembly further includes a temperature measurement means for measuring temperature in the living body.

27. Sensor and insertion assembly according to claim 26, wherein said sensor chip further is provided with an additional piezoelectric element in a form of a strip as the temperature measurement means and that energy is applied to the additional piezoelectric element via a first interdigital transducer and an output signal that varies in dependence on an ambient temperature is available at a second interdigital transducer.

28. Sensor and insertion assembly according to claim 16, wherein said piezoelectric element is an elastic piezoelectric film arranged as a layer on said pressure sensitive film.

29. Sensor and insertion assembly according to claim 16, wherein said piezoelectric element is a piezoelectric beam arranged on said pressure sensitive film.

30. Sensor and insertion assembly according to claim 16, wherein the piezoelectric element and the pressure sensitive film are arranged at the same substrate body.

31. Sensor and insertion assembly according to claim 16, wherein said output signal is derived by measuring properties of bulk acoustic waves (BAW) through said piezoelectric element.

32. Sensor and insertion assembly according to claim 16, wherein said output signal is derived by measuring properties of surface acoustic waves (SAW) on said piezoelectric element.

33. Sensor and insertion assembly according to claim 16, wherein said output signal is derived by measuring properties of lamb waves of said piezoelectric element.

34. Sensor and insertion assembly according to claim 16, wherein said measured properties include a delay of the acoustic waves.

35. Sensor and insertion assembly according to claim 16, wherein said measured properties include a change of resonant frequency of the acoustic waves.

36. Sensor and insertion assembly according to claim 16, wherein the cavity is evacuated and the output signal then represents an absolute pressure.

37. Sensor and insertion assembly according to claim 16, wherein the sensor chip has a length of less than 5 mm and a width and thickness of less than 0.5 mm, respectively.

* * * * *